US008213800B1

(12) United States Patent
Liu et al.

(10) Patent No.: US 8,213,800 B1
(45) Date of Patent: Jul. 3, 2012

(54) WIRELESS BACKHAUL COMMUNICATION USING PASSIVE OPTICAL NETWORK

(75) Inventors: David Hwa-Wei Liu, Herndon, VA (US); Fung-Chang Huang, Herndon, VA (US); James M. Hallam, Oswego, IL (US)

(73) Assignee: Tellabs Operations, Inc., Naperville, IL (US)

( * ) Notice: Subject to any disclaimer, the term of this patent is extended or adjusted under 35 U.S.C. 154(b) by 358 days.

(21) Appl. No.: 12/504,899

(22) Filed: Jul. 17, 2009

(51) Int. Cl.
*H04B 10/00* (2006.01)
(52) U.S. Cl. ............................ 398/115; 398/72; 398/141
(58) Field of Classification Search .............. 398/66–73, 398/115–117, 140, 141
See application file for complete search history.

(56) References Cited

U.S. PATENT DOCUMENTS

| | | | | |
|---|---|---|---|---|
| 5,987,303 A * | 11/1999 | Dutta et al. | .................... | 725/106 |
| 6,684,030 B1 * | 1/2004 | Taylor et al. | .................... | 398/59 |
| 7,088,724 B2 * | 8/2006 | Yamanaka | ................ | 370/395.52 |
| 7,171,121 B1 * | 1/2007 | Skarica et al. | ................... | 398/67 |
| 7,599,620 B2 * | 10/2009 | Graves et al. | ................... | 398/51 |
| 7,623,858 B2 * | 11/2009 | Johnston, Jr. | ............. | 455/426.1 |
| 7,684,403 B2 * | 3/2010 | Kim et al. | ...................... | 370/392 |
| 7,724,703 B2 * | 5/2010 | Matta et al. | ................... | 370/329 |
| 7,724,704 B2 * | 5/2010 | Simons et al. | ................ | 370/329 |
| 7,756,156 B2 * | 7/2010 | Tuoriniemi et al. | .......... | 370/468 |
| 7,813,353 B2 * | 10/2010 | Anschutz et al. | ............ | 370/398 |
| 7,817,611 B2 * | 10/2010 | Ogura | ........................... | 370/338 |
| 7,848,654 B2 * | 12/2010 | Sauer et al. | .................... | 398/115 |
| 7,925,156 B2 * | 4/2011 | Weber et al. | ..................... | 398/25 |
| 2002/0171897 A1 * | 11/2002 | Cho et al. | ....................... | 359/172 |
| 2003/0152389 A1 * | 8/2003 | Sala et al. | ........................ | 398/98 |
| 2004/0028405 A1 * | 2/2004 | Unitt et al. | ...................... | 398/32 |
| 2004/0208570 A1 * | 10/2004 | Reader | ............................ | 398/79 |
| 2007/0201872 A1 * | 8/2007 | Yim et al. | ....................... | 398/66 |
| 2007/0230480 A1 * | 10/2007 | Ikeda et al. | ............. | 370/395.52 |
| 2007/0230481 A1 * | 10/2007 | Ikeda et al. | ............. | 370/395.53 |
| 2008/0219669 A1 * | 9/2008 | Fourcand | ........................ | 398/98 |
| 2008/0232801 A1 * | 9/2008 | Arnold et al. | ................... | 398/58 |
| 2008/0260389 A1 * | 10/2008 | Zheng | .......................... | 398/115 |
| 2008/0298809 A1 * | 12/2008 | Zheng | .......................... | 398/118 |
| 2009/0003831 A1 * | 1/2009 | Zheng | .......................... | 398/115 |
| 2009/0016713 A1 * | 1/2009 | Liu et al. | ......................... | 398/17 |
| 2009/0097490 A1 * | 4/2009 | Sanderson et al. | ........ | 370/395.53 |
| 2009/0245805 A1 * | 10/2009 | Akasaka et al. | ............. | 398/128 |
| 2010/0014868 A1 * | 1/2010 | McGlynn et al. | .............. | 398/115 |
| 2010/0098414 A1 * | 4/2010 | Kramer et al. | ................... | 398/45 |
| 2010/0296497 A1 * | 11/2010 | Karaoguz et al. | ............. | 370/338 |
| 2010/0296499 A1 * | 11/2010 | Karaoguz et al. | ............. | 370/338 |

* cited by examiner

*Primary Examiner* — Agustin Bello
(74) *Attorney, Agent, or Firm* — JW Law Group; James M. Wu (57) ABSTRACT

A wireless communication network system includes a central office network, a plurality of cell sites, each for communicating wirelessly with external cellular phones within its transmission range, and a passive optical network (PON)-based wireless backhaul system that transfers communication information between the cell sites and the central office network. The PON-based wireless backhaul system further includes at least a source optical network terminal (ONT), an optical line terminal (OLT), and a quality of service (QoS) converter in each of the source ONT and OLT to allow for quality of service-enabled communication between the cell sites and the central office network via the PON-based wireless backhaul system.

20 Claims, 10 Drawing Sheets

WIRELESS BACKHAUL COMMUNICATION USING PASSIVE OPTICAL NETWORK

FIELD

The technical field of embodiments of the present invention relate to communication networks. More specifically, embodiments of the present invention relate to improving wireless backhaul communication services using passive optical networks.

BACKGROUND

Wireless backhaul service typically refers to wire-line communication links between a central office network and its wireless cell sites that communicate with external cell (i.e., cellular or mobile) phones wirelessly within their transmission ranges. In other words, a wireless backhaul system transfers or hauls communication information between its central office network and cell sites. The cell sites then communicate wirelessly with external cell phones. The cell sites, the wireless backhaul system, and the central office network constitute the basic structure of a wireless service network.

A typical wireless backhaul system includes T1 links that are connected to cell sites for transferring communication (e.g., voice, data, or video) traffic from the cell sites to a local exchange network. T1 means any digitally multiplexed telecommunication carrier system that runs at the 1.544 Megabit per second line rate. The communication traffic is then routed via the local exchange network to a central office network via another T1 communication link.

One drawback associated with this prior art approach is the bandwidth constraint on the T1 links as the transfer rate offered by a T1 line is only approximately 1.544 MB (Mega Bits) per second. This is certainly not sufficient to support voice, high-speed data (e.g., emails, Internet), and video transfer services, thus making the wireless backhaul system the bottleneck in providing high speed wireless communication services. Another drawback is the cost constraint as the T1 lines typically use copper wires, which are relatively expensive.

Figure 1:
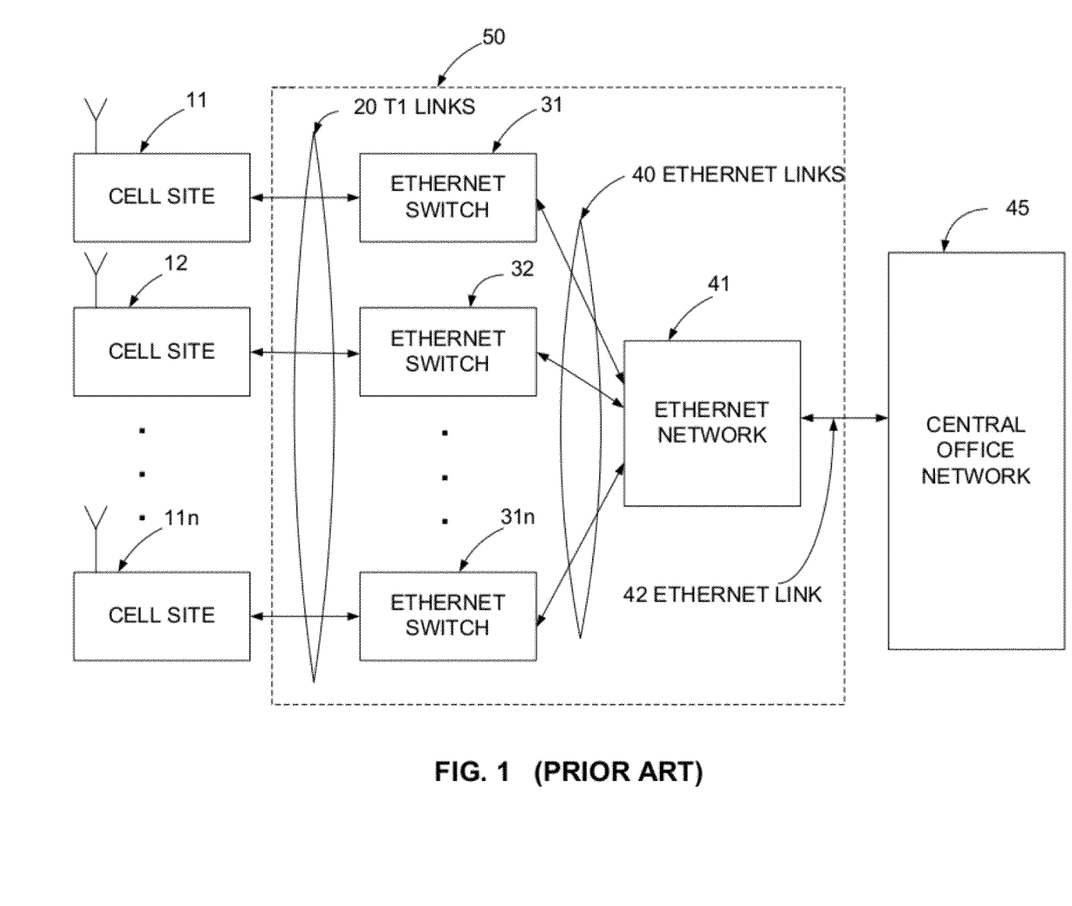
FIG. 1 is a block diagram illustrating a prior art wireless backhaul system of a wireless communication system.

One prior solution to the above drawback is to migrate to Ethernet-based wireless backhaul system which provides significantly higher bandwidth (e.g., approximately 100 MB per second transfer rate) to transport wireless backhaul traffic between the cell sites and the central office network, as is shown in FIG. 1. As can be seen from FIG. 1, the prior art Ethernet-based wireless backhaul system 50 includes a number of Ethernet switches 31 through 31n, each connected to one of the cell sites 11-11n via one of the T1 links 20. The Ethernet switches 31-31n are connected to an Ethernet network 41 via Ethernet links 40. The Ethernet network 41 is then connected to routers (not shown in FIG. 1) within the central office network 45 via a high speed Ethernet link 42.

However, disadvantages are associated with this prior art approach. One disadvantage is that the Ethernet links 40 and 42 need to be repeated approximately every one hundred meters (e.g., approximately three hundred thirty feet). This will significantly increase the cost of the backhaul system if the distances from the cell sites to the central office network are significantly longer than 100 meters. Another disadvantage is that the prior art Ethernet-based wireless backhaul system also requires active devices or equipment within the system, thus increasing the cost of deploying and maintaining the system.

Thus, what is needed is a wireless backhaul system that transports long distance communication traffic between the cell sites and the central office network at a high transfer rate cost effectively.

SUMMARY

A wireless communication network system includes a central office network, a plurality of cell sites, each for communicating wirelessly with external cellular phones within its transmission range, and a passive optical network (PON)-based wireless backhaul system that transfers communication information between the cell sites and the central office network. The PON-based wireless backhaul system further includes at least a source optical network terminal (ONT), an optical line terminal/termination (OLT), and a quality of service (QoS) converter in each of the ONT and OLT to allow for quality of service-enabled communication between the cell sites and the central office network via the PON-based wireless backhaul system.

Additional features and benefits of the exemplary embodiment(s) of the present invention will become apparent from the detailed description, figures and claims set forth below.

BRIEF DESCRIPTION OF THE DRAWINGS

Exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Exemplary embodiments of the present invention are described herein in the context of a passive optical network (PON)-based wireless backhaul system 100 (FIG. 2) for a wireless communication network system 150 that includes a central office network 120 and a number of cell sites (e.g., 110), each for communicating wirelessly with external cellular phones within its transmission range. The PON-based wireless backhaul system 100 transfers communication information between the cell sites and the central office network.

Figure 2:
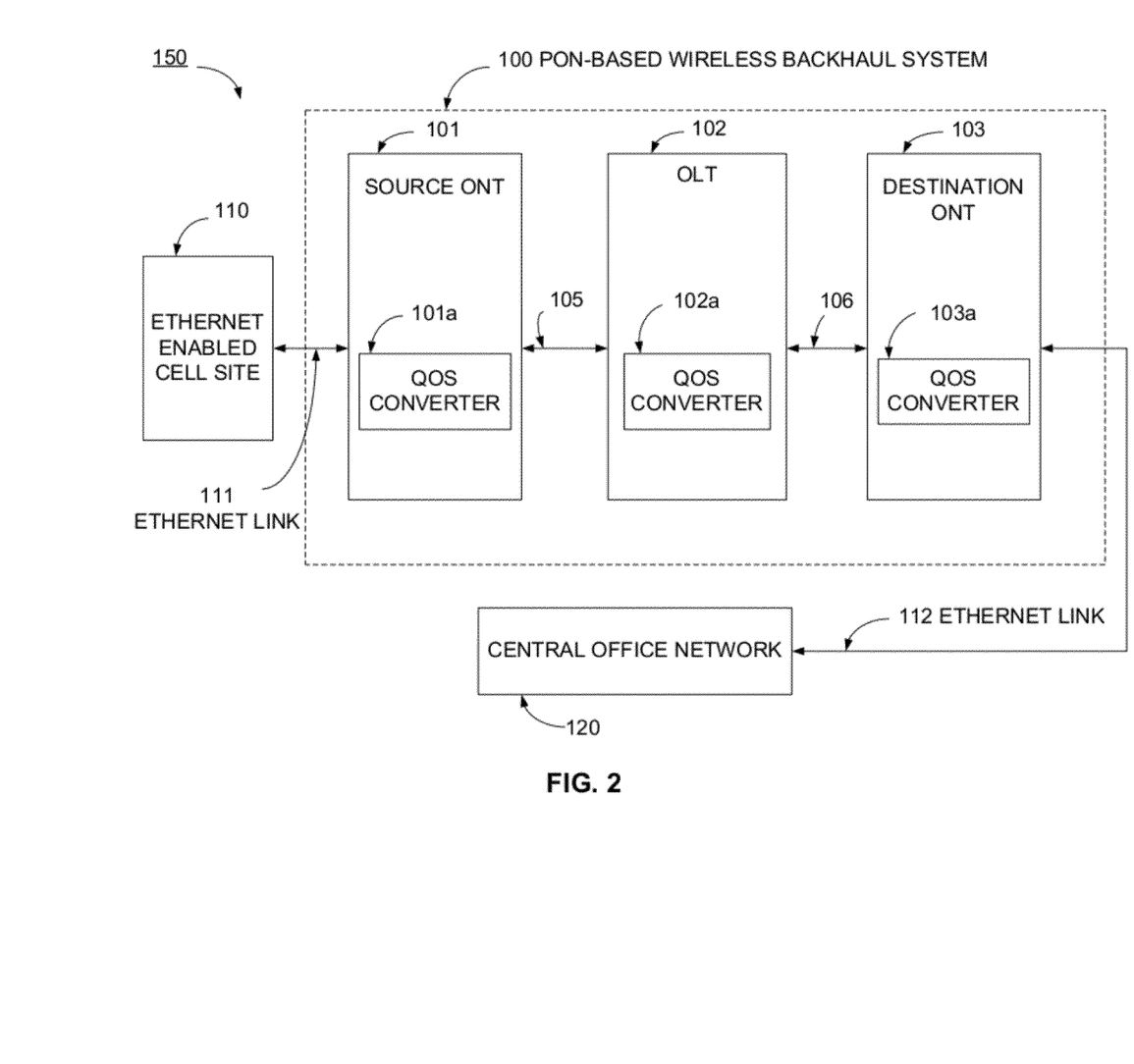
FIG. 2 is a block diagram illustrating a wireless communication network system that includes a PON (Passive Optical Network)-based wireless backhaul system that implements one embodiment of the present invention, wherein the PON-based wireless backhaul system includes a source optical network terminal (ONT), an optical line terminal (OLT), a destination ONT, and a QoS (Quality of Service) converter in each component in the PON-based system.

The PON-based wireless backhaul system 100 allows for high speed data transfer over relatively long distance (e.g., up to 120 Kilometers) between the central office network 120 and the cell sites (e.g., 110) without requiring any repeater. The PON-based wireless backhaul system 100 does not require active device or equipment, and requires relatively lower cost to deploy and maintain. It also provides point to multipoint transport service.

The PON-based wireless backhaul system 100 includes at least a source optical network terminal (ONT) 101, an optical line terminal/termination (OLT) 102, and a quality of service (QoS) converter (e.g., 101a and 102a) in each of the ONT and OLT to allow for end-to-end QoS-enabled communication between the cell sites (e.g., 110) and the central office network 120. This and other above-described features of the PON-based wireless backhaul system 100 in accordance with embodiments of the present invention will be described in more detail below, also in conjunction with FIGS. 2-10.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application-related and business-related constraints, and that these specific goals will vary from one implementation to another and from one developer to another. It, however, will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure unless otherwise defined.

The term "cell site" means an electronic wireless system at a physical location that includes antennas and electronic communication equipment (e.g., transmitter/receiver transceivers, digital signal processors, control electronics, GPS (Global Position System) receivers, electrical power sources, and/or sheltering) to create a cell in a wireless communication network system. The term "cell site" can also be referred to as "mobile phone master", "base station", or "base station site".

The term "optical network terminal" (ONT) can also be interchangeably referred to as "optical network unit" (ONU), or "optical network termination", or "optical network termination unit" (ONTU). ONT is mostly used in the ITU-T communication standard while ONU is a term under the IEEE communication standard. This means that the terms refer to the same device, component, or element.

The term "communication link" generally means a physical element for linking two or more points together within a communication system. The physical element can be an electrical (e.g., coaxial, T1, or Ethernet) cable or an optical cable. The communication link can also be wireless (e.g., via radio frequency or microwave).

The term "communication traffic" or "communication information" generally means voice, data, and video information transported via the wireless communication network system. The data information generally refers to Internet, email, and image data, as well as system management data (e.g., data regarding operation, administration, and maintenance (OAM) of the wireless communication network system).

The term "QoS" or "Quality of Service" means resource reservation control mechanism in a communication network system. Fundamentally, QoS enables a communication network to provide better service to certain data flows. This is done by either raising the priority of a flow or limiting the priority of another flow. Thus, QoS means the ability or mechanism to provide different priority to different applications, users, or data flows, or to guarantee a certain level of performance to a data flow or a user. In other words, it is a performance measure indicating the quality of transmission of a communication transmission system and the usage degree of a service. The term also refers to a technology or mechanism that specifies service classes according to the degree of quality of connection service promised or guaranteed to various types of communication traffic (i.e., voice, data, and system administration and management), and continuously guarantees the level of quality of service in each of the specified service classes.

In FIG. 2, only one cell site 110 is shown in the wireless communication network system 150. This is for illustration purposes only. In practice, many more such cell sites may and will be employed in the wireless communication network system 150.

The cell site 110 communicates wirelessly with external cellular or mobile phones (not shown) within its wireless transmission range. The cell site 110 receives communication information from the external cellular phones wirelessly and transmits communication information to the external cellular phones wirelessly.

The cell site 110 is Ethernet-enabled or Ethernet-based, in one embodiment. This means that the cell site 110 includes an Ethernet interface (not shown in FIG. 2) that converts communication traffic from the cell site 110 into Ethernet traffic that is transported to other systems of the wireless communication network system 150 via an Ethernet link 111. The cell site 110 may include more than one Ethernet interface.

In another embodiment, the cell site 110 is not Ethernet enabled and passes communication traffic to a T1 communication link. In that case, an external Ethernet interface device such as smart integrated access device (SIAD) (manufactured and sold by Tellabs Operations, Inc. of Naperville, Ill.) is used to convert the communication traffic into Ethernet traffic. In addition, the SIAD can be connected to more than one cell site as an Ethernet interface for multiple cell sites. The SIAD is then connected to the Ethernet link 111. The structure and operation of the SIAD is known and therefore will not be described in more detail below.

In one embodiment, the cell site 110 is a base transceiver station (BTS) of a 2G (second generation) wireless communication network. In another embodiment, the cell site 110 is a 3G (third generation) wireless communication base station commonly referred to as Node B. In a further embodiment, the cell site 110 may include a combination of 2G, 3G, and 4G wireless communication base stations.

Functionally, the cell site 110 includes antennas and electronic communication devices (e.g., transmitter/receiver transceivers, digital signal processors, control electronics, GPS (Global Position System) receivers, electrical power sources, and/or sheltering). These electronic communication devices are well known and will not be described in more detail below. This also means that the structure, function, and operation of the cell site 110 are well known and will not be described in more detail below.

The cell site 110 is connected to the wireless backhaul system 100 via the Ethernet link 111. In one embodiment of the present invention, the wireless backhaul system 100 is a PON-based communication system. The PON-based wireless backhaul system 100 is then connected to the central office network 120 via another Ethernet link 112, in one embodiment. The central office network 120 includes a number of communication equipment or devices (not shown) such as core routers (e.g., Tellabs 8800 Multi Services Routers manufactured and sold by Tellabs Operations, Inc. of Naperville, Ill.), radio network controller, media gateways, base site controller, OAM (Operation, Administration, and Maintenance) routers, and system management devices. These electronic communication devices are well known and will not be described in more detail below.

The core routers within the central office network 120 receive the communication traffic from the wireless backhaul system 100 via the Ethernet link 112, and then direct the traffic to the appropriate devices within the central office network 120. The directed traffic may be re-directed back to one of the cell sites of the communication network system 150, or may be sent to other communication networks (not shown) that are connected to the central office network 120. In the case where the traffic is system management data, the system management devices within the central office network 120 then take appropriate actions in accordance with the system management data received.

As can be seen from FIG. 2, the PON-based wireless backhaul system 100 includes the source ONT 101, the OLT 102, and the destination ONT 103. These optical devices are connected via optical communication links 105 and 106. The source ONT 101 is also connected to the cell site 110 via the Ethernet link 111 and the destination ONT 103 is also connected to the central office network 120 via the Ethernet link 112.

The optical communication links 105 and 106 include optic fibers and splitters. Thus, the optical communication links 105 and 106 can also be referred to as optical distribution network (ODN). Each of the ONTs 101 and 103 is a device that terminates the PON-based wireless backhaul system 100 and presents customer service interfaces to the external systems (e.g., the cell site 110 or the central office network 120) connected to the PON-based system 100. The source ONT 101 provides the interface between the cell site 110 and the PON-based system 100. The destination ONT 103 provides the interface between the network services from the central office network 120 and the PON-based system 100.

The OLT 102 is responsible for allocating upstream bandwidth to the ONTs 101 and 103. The OLT 102 manages data transmissions via the ONTs 101 and 103, including transmission delays caused by the varying physical distances from the OLT 102 to the ONTs 101 and 103. In the case where the OLT 102 is directly connected to the external central office network 120, the OLT 102 provides the interface between the network services from the central office network 120 and the PON-based system 100. These above described structural aspects and functions of the OLT 102 and the ONTs 101 and 103 are known and will not be described in more detail below.

The adoption of the PON-based wireless backhaul system 100 in the wireless communication network system 150 allows for high speed data transfer over relatively long distance (e.g., up to 120 Kilometers) between the central office network 120 and the cell sites (e.g., 110) without requiring any repeater. The PON-based wireless backhaul system 100 does not require active device or equipment, and requires relatively lower cost to deploy and maintain. It also provides point to multipoint transport service.

As described above, the communication traffic allowed in the wireless communication network system 150 includes voice and data traffic. The data traffic may include Internet, email, image, and system management data. Alternatively, the communication traffic may include video traffic.

The wireless communication network system 150 includes a communication model in which devices connected to networks intercommunicate using message signals. In one embodiment, these message signals include sequences of packets or cells, which have header information and which conform to the OSI (Open Systems Interconnection) model. In the OSI model, an application protocol (layer 5, such as FTP (File Transfer Protocol)) uses a transport protocol (layer 4, such as TCP (Transmission Control Protocol)), which uses a network protocol (layer 3, such as Internet Protocol (IP)), which uses a media access control (MAC) protocol (layer 2), which uses a physical transport technique (layer 1). In addition, the wireless communication network system 150 employs ATM (Asynchronous Transfer Mode) data transmission technology. ATM is a packet switching protocol that encodes data into small fixed-sized cells and provides data link layer services that run over OSI Layer 1 physical links. This means that ATM protocol is performed at OSI Layer 2.

ATM supports different types of services via ATM Adaption Layers (AAL). Standardized AALs include AAL1, AAL2, and AAL5, and the rarely used AAL3 and AAL4. AAL2 is used for voice traffic and AAL5 is used for data traffic. AAL1 is used for circuit emulation. This means that the communication traffic from the cell sites (e.g., cell site 110) is ATM-based.

Because some communication traffic (e.g., voice and sometimes video) from the cell site 110 may be very sensitive to delay, jitter, and packet loss, it is important to control or provide QoS by prioritizing voice traffic over other types of traffic (e.g., data traffic and system management traffic). To provide QoS to the communication traffic in the cell site 110, the voice traffic needs to be given priority over data and other types of traffic. If the traffic includes video traffic, the video traffic may also be prioritized over data and management traffic. Because the communication at the cell site 110 is ATM-based, the prioritization can be achieved as follows:

Voice Path A (AAL2)
Voice Path B (AAL2)
Voice Path C/D (AAL2)
Data (e.g., Q2630.2) (AAL5)
Management (e.g., NBAP-Common) (AAL5)
Management (e.g., Mub O&M) (AAL5)

Then the Ethernet interface (e.g., SIAD) within the cell site 110 transmits the prioritized communication traffic to the central office network 120 via the PON-based wireless backhaul system 100 while maintaining the QoS of the traffic. The Ethernet interface within the cell site 110 employs IP QoS mechanism to maintain the traffic prioritization. This means that QoS control is performed at the IP layer (i.e., OSI Layer 3).

This is done by assigning the prioritized traffic a unique Virtual Local Area Network (VLAN) ID or VLAN tag. The VLAN ID can be referred to as subscriber VLAN ID. This operation is done at the Ethernet interface within the cell site 110. The term VLAN ID can also be referred to as IP priority tag or QoS parameter.

However, when the QoS-controlled communication traffic passes through the PON-based wireless backhaul system 100, the ONTs 101 and 103 and the OLT 102 cannot deal with the QoS parameters at the IP layer as they do not have the IP layer protocol in the protocol stack. Therefore, although the optical devices 101-103 can deal with QoS control relying on optical data on the physical layer protocol stack, QoS control of traffic cannot be ensured if collision occurs while data pass through the optical devices 101-103.

Figure 3:
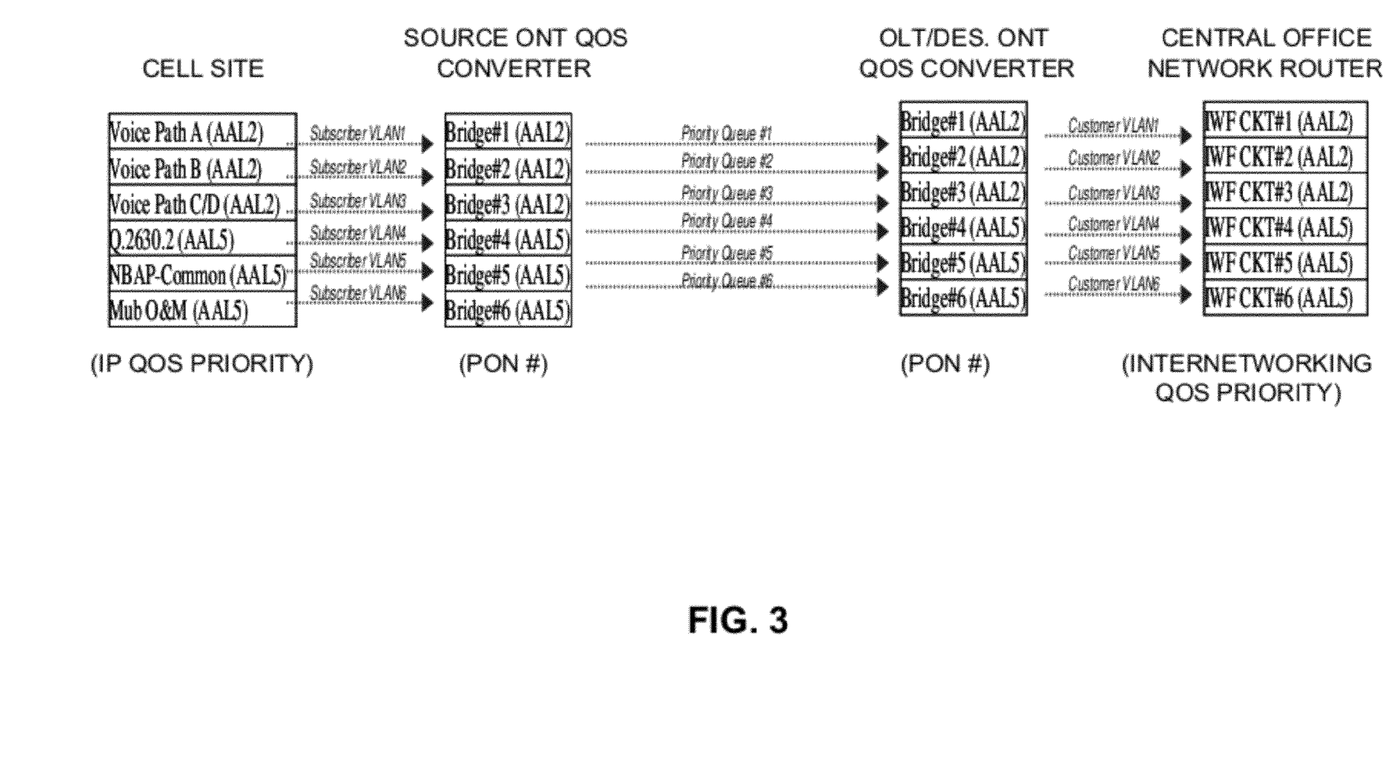
FIG. 3 illustrates an overview of the QoS conversion procedure in the wireless communication network system of FIG. 2 according to an embodiment of the present invention.

To achieve QoS in the PON-based wireless backhaul system 100, the VLAN IDs are converted from the IP layer (i.e., the OSI Layer 3) to PON numbers at the OSI Layer 2 as the ONTs 101 and 103 and OLT 102 transport only at the OSI Layer 2. This is achieved by the QoS converter (e.g., 101a-103a) in each of the optical devices 101-103. This QoS conversion procedure overview is shown in FIG. 3, which will be described in more detail below. The operation of each of the converters 101a-103a is shown in FIGS. 4-5, which will also be described in more detail below.

As can be seen from FIGS. 2-3, packets are tagged with subscriber VLAN IDs when transmitted out of the cell site 110. The QoS converter 101a in the source ONT 101 then converts the subscriber VLAN IDs to PON numbers. Traffic from the source ONT 101 is then transparently bridged to the destination ONT 103 via the OLT 102. Thus, the QoS converter 102a is transparent in this case. When the OLT 102 is directly connected to the central office network 120, it will perform the QoS conversion operation.

The packets are received at the destination ONT 103, along with their PON numbers. The QoS converter 103a in the destination ONT 103 then strips the PON numbers from the packets and assigns them with appropriate customer VLAN IDs. The customer VLAN IDs are then received at the core router of the central office network 120. The router associates each customer VLAN IDs with an appropriate Internetworking QoS priority. In doing so, the end-to-end QoS-enabled communication is achieved in the wireless communication network system 150.

Figure 4:
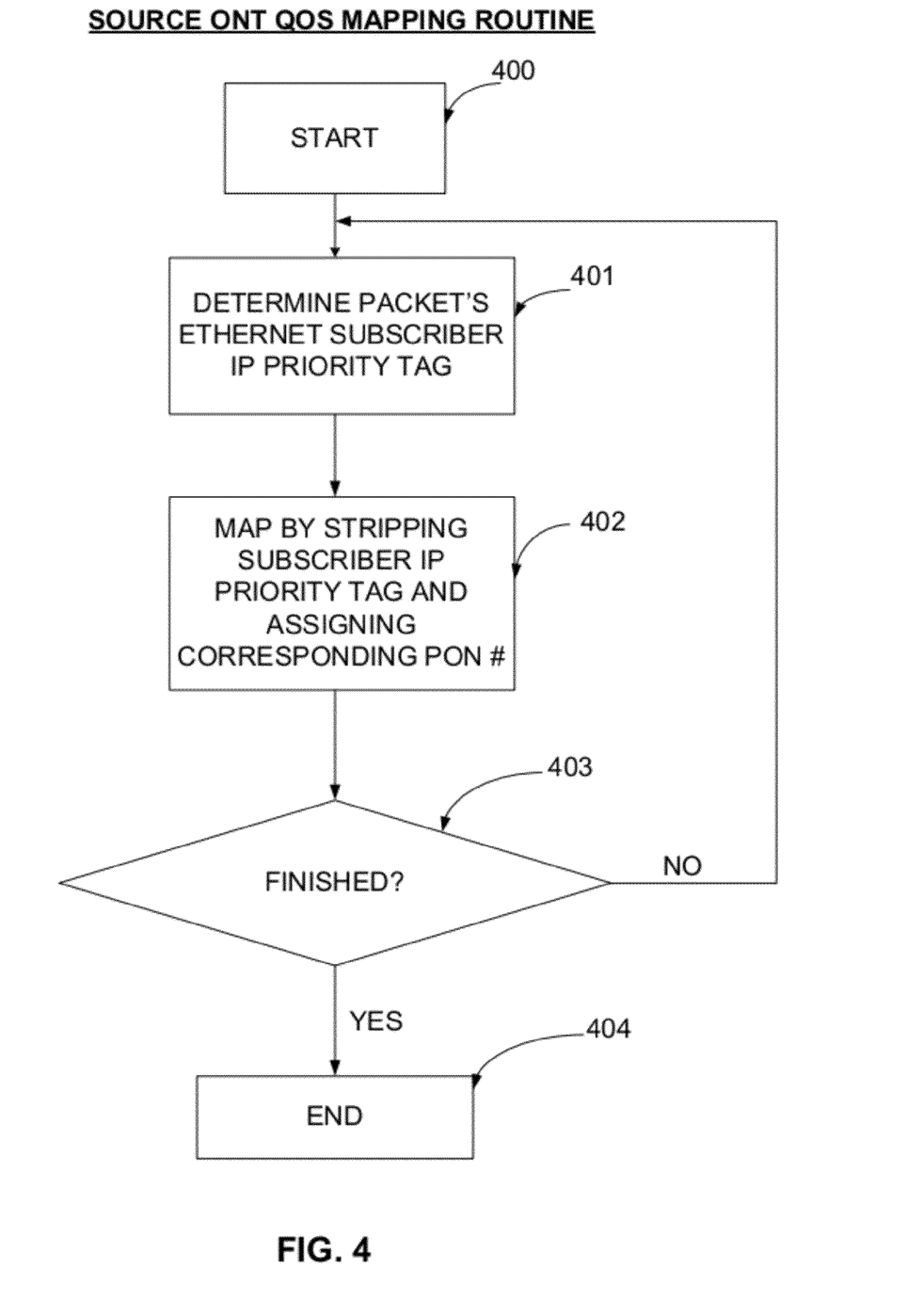
FIG. 4 is a flowchart diagram illustrating an exemplary procedure of a QoS mapping routine performed by the QoS converter in the source ONT of FIG. 2 in accordance with one embodiment of the present invention.
Figure 5:
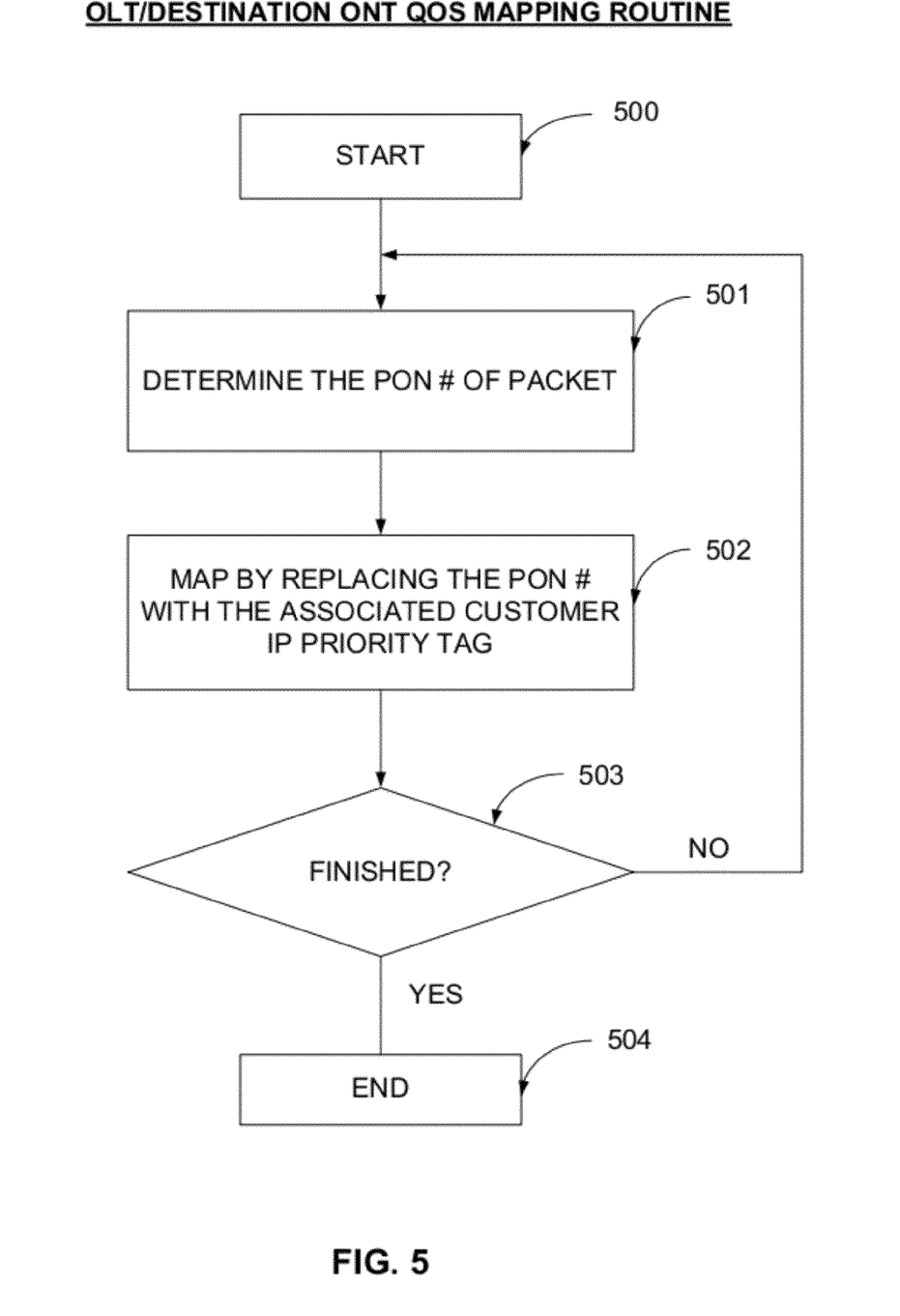
FIG. 5 is a flowchart diagram illustrating an exemplary procedure of a QoS mapping routine performed by the QoS converter in the OLT or the destination ONT of FIG. 2 in accordance with one embodiment of the present invention.

FIG. 4 shows a flowchart diagram illustrating an exemplary procedure of a QoS mapping routine performed by the QoS converter 101a in the source ONT 101 of FIG. 2 in accordance with one embodiment of the present invention. As can be seen from FIGS. 2 and 4, the procedure starts at the block 400. At 401, the converter 101a determines the VLAN ID (i.e., Subscriber IP priority tag) of the traffic. The traffic is in the form of data frame, data packet, or data stream.

At 402, the converter 101a maps the VLAN ID by stripping the VLAN ID (i.e., Subscriber IP priority tag) from the packet and assigning a corresponding PON number to the packet. Then the procedure determines at 403 if it is time to end. If not, the procedure goes back to the block 401. If so, the procedure ends at 404.

FIG. 5 shows a flowchart diagram illustrating an exemplary procedure of a QoS mapping routine performed by the QoS converter (i.e., 102a or 103a) in the OLT 102 or in the destination ONT 103 of FIG. 2 in accordance with one embodiment of the present invention. In the case where the destination ONT is employed in the PON-based wireless backhaul system, the procedure is for the QoS converter 103a in the destination ONT. In the case where the OLT 102 is directly connected to the central office network 120, then procedure is for the QoS 102a of the OLT 102.

As can be seen from FIGS. 2 and 5, the procedure starts at 500. At 501, the QoS converter determines the PON number of the packet to be transported to the central office network 120. At 502, the PON number is mapped with the associated customer IP priority tag (i.e., customer VLAN ID). The procedure then determines at 503 if it is time to end. If not, the procedure goes back to block 501. Otherwise, the procedure ends at block 504.

Figure 6:
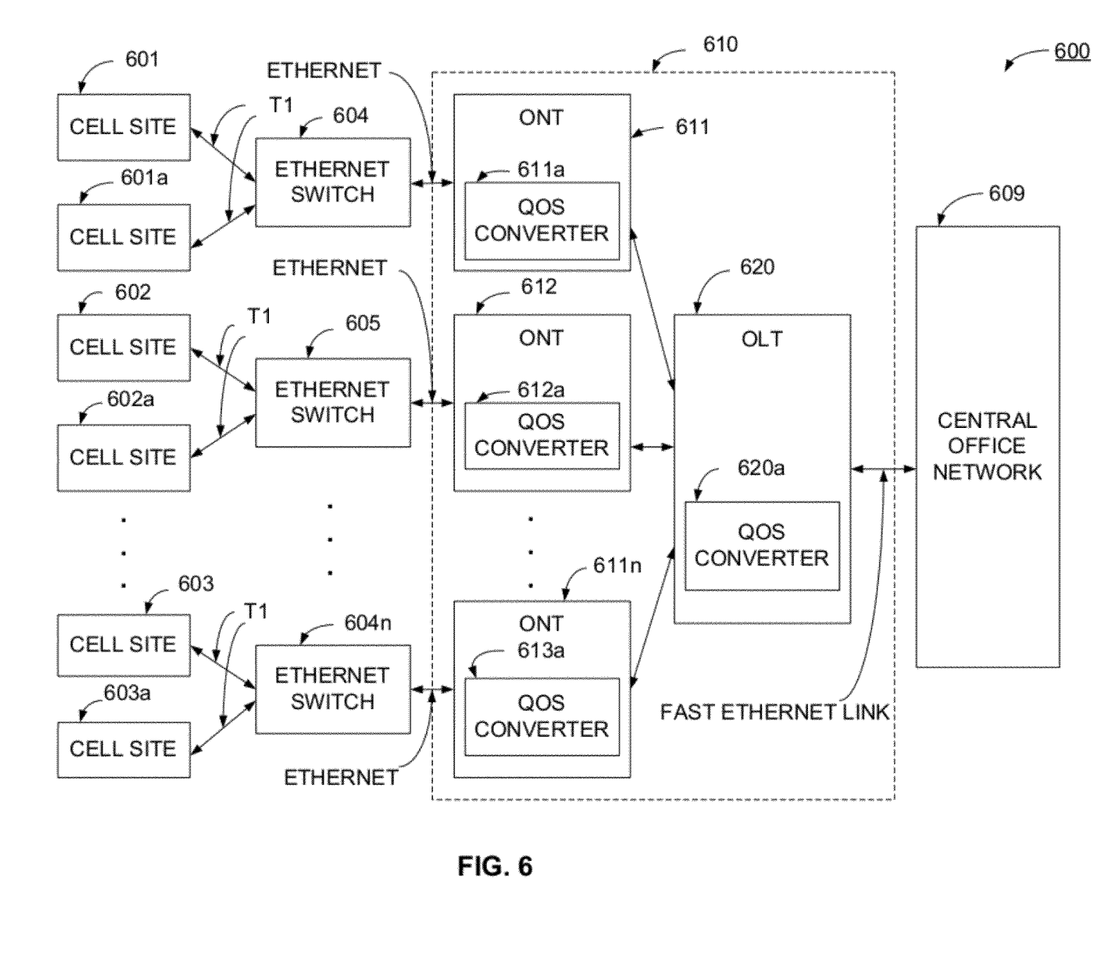
FIG. 6 is a block diagram illustrating another PON-based wireless backhaul system within a wireless communication network system that implements another embodiment of the present invention, wherein the PON-based wireless backhaul system includes a number of source ONTs, an OLT, and a QoS converter in each component in the PON-based system.

FIG. 6 shows the block diagram illustrating another PON-based wireless backhaul system 610 within a wireless communication network system 600 that implements another embodiment of the present invention, wherein the PON-based wireless backhaul system 610 includes a number of source ONTs 611-611n, an OLT 620, and a QoS converter (e.g., 611a, 612a, or 611n) in each component in the PON-based system 610. Each of the Ethernet switches 640-604n can be an SIAD.

Figure 7:
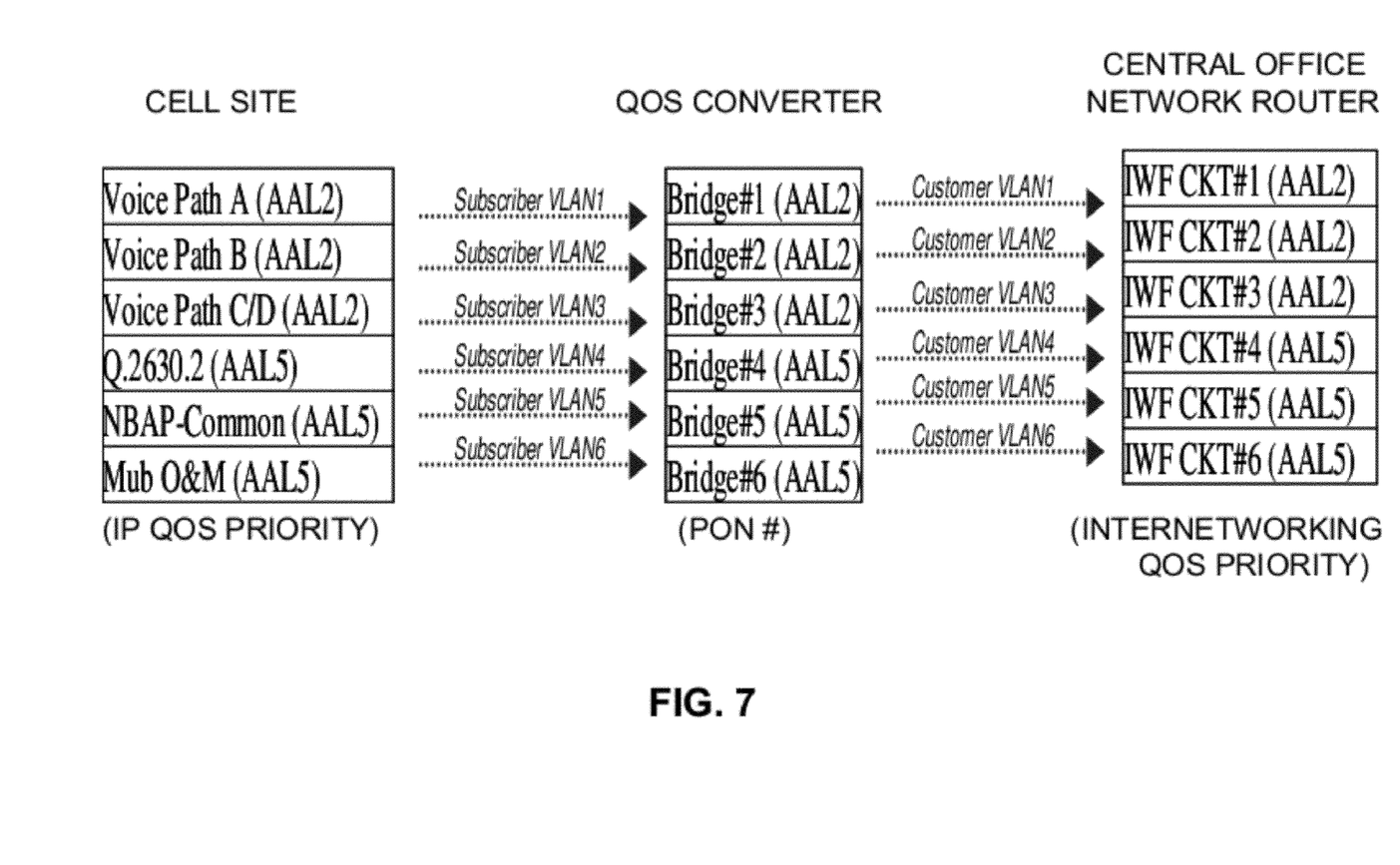
FIG. 7 illustrates an overview of the QoS conversion procedure in the wireless communication network system of FIG. 6 according to an embodiment of the present invention.

As can be seen from FIGS. 2 and 6, the PON-based wireless backhaul system 610 is the same as the PON-based wireless backhaul system 100 of FIG. 2, except that the system 610 does not include a destination ONT and the OLT 620 is directly connected to the central office network 609. Because the PON-based wireless backhaul system 600 does not have the destination ONT, the QoS conversion procedure of the PON-based system 600 omits the bridge to bridge transmission. FIG. 7 illustrates the overview of the QoS conversion procedure in the wireless communication network system 600 of FIG. 6.

Figure 8:
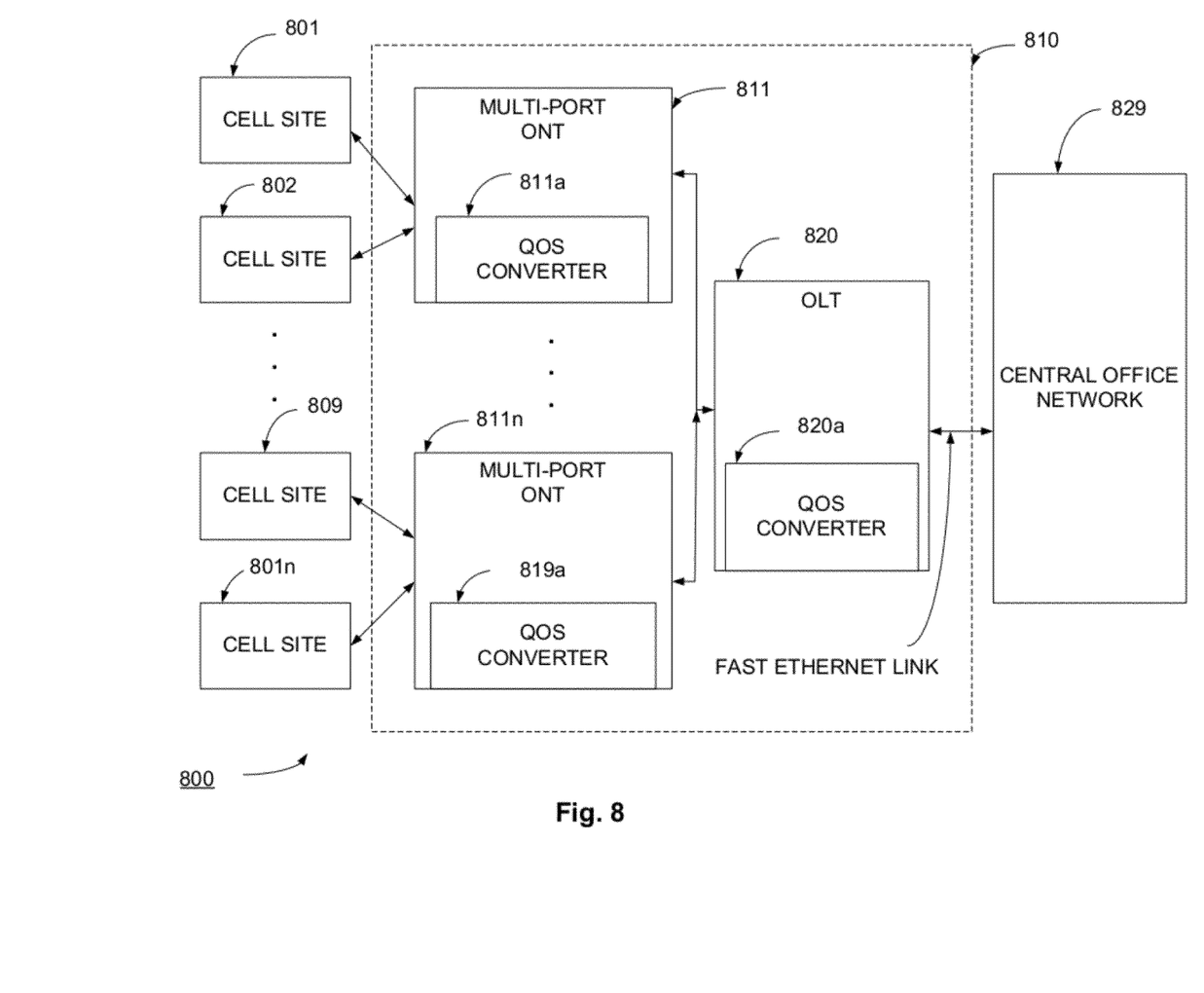
FIG. 8 is a block diagram illustrating yet another PON-based wireless backhaul system in the wireless communication network system in accordance with yet another embodiment of the present invention, wherein the PON-based wireless backhaul system includes a number of multi-port source ONTs, an OLT, and a QoS converter in each component in the PON-based system.

FIG. 8 shows yet another PON-based wireless backhaul system 810 in a wireless communication network system 800 in accordance with yet another embodiment of the present invention. As can be seen from FIG. 8, the PON-based wireless backhaul system 810 includes a number of multi-port source ONTs 811-811n, each being connected to a number of cell sites (e.g., 801-802 or 809-801n). In one embodiment, each of the source ONTs 811-811n includes multiple Ethernet interfaces or ports. This makes the ONTs 811-811n multi-port ONTs.

Figure 9:
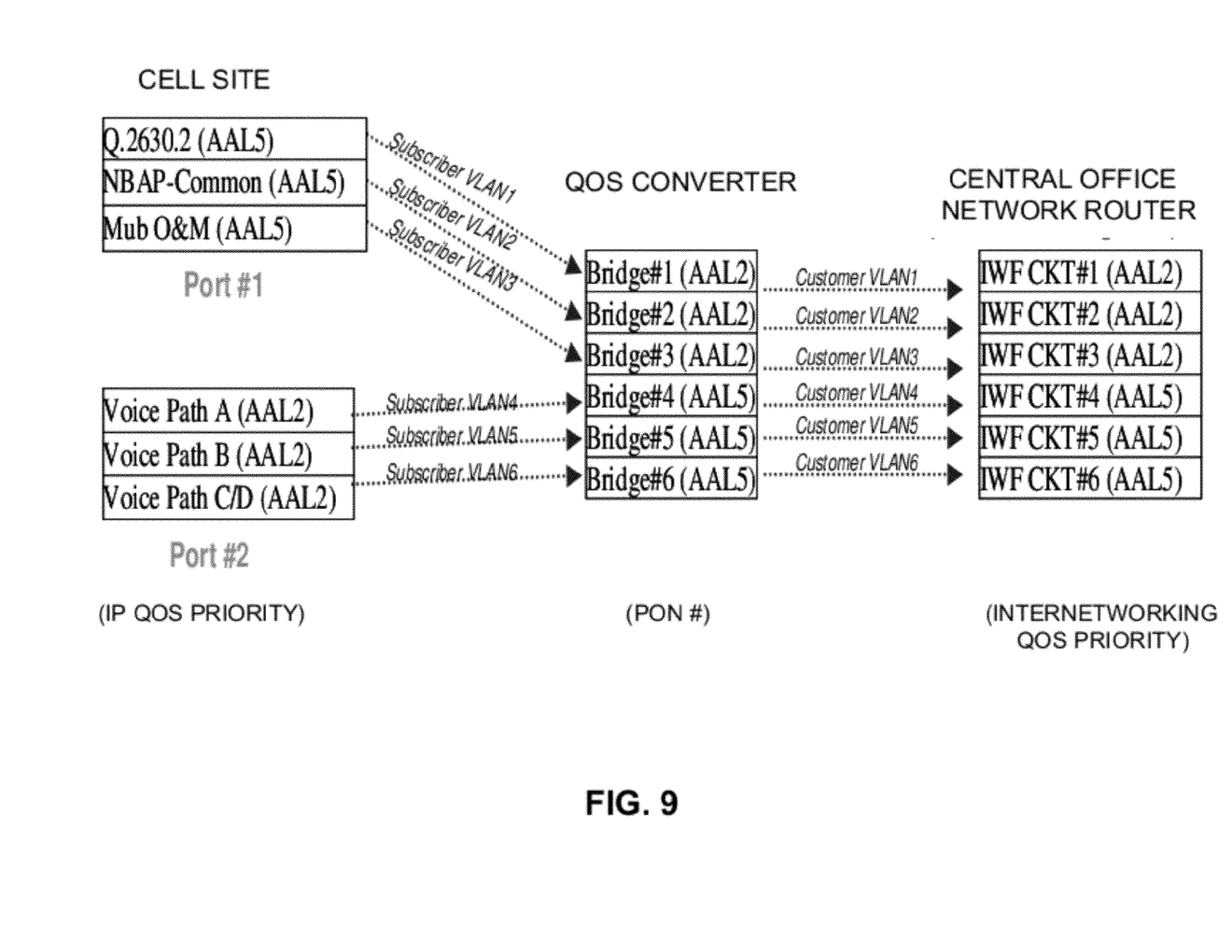
FIG. 9 illustrates an overview of the QoS conversion procedure in the wireless communication network system of FIG. 8 according to an embodiment of the present invention.

FIG. 9 illustrates the overview of the QoS conversion procedure in the wireless communication network system 800 of FIG. 8.

Figure 10:
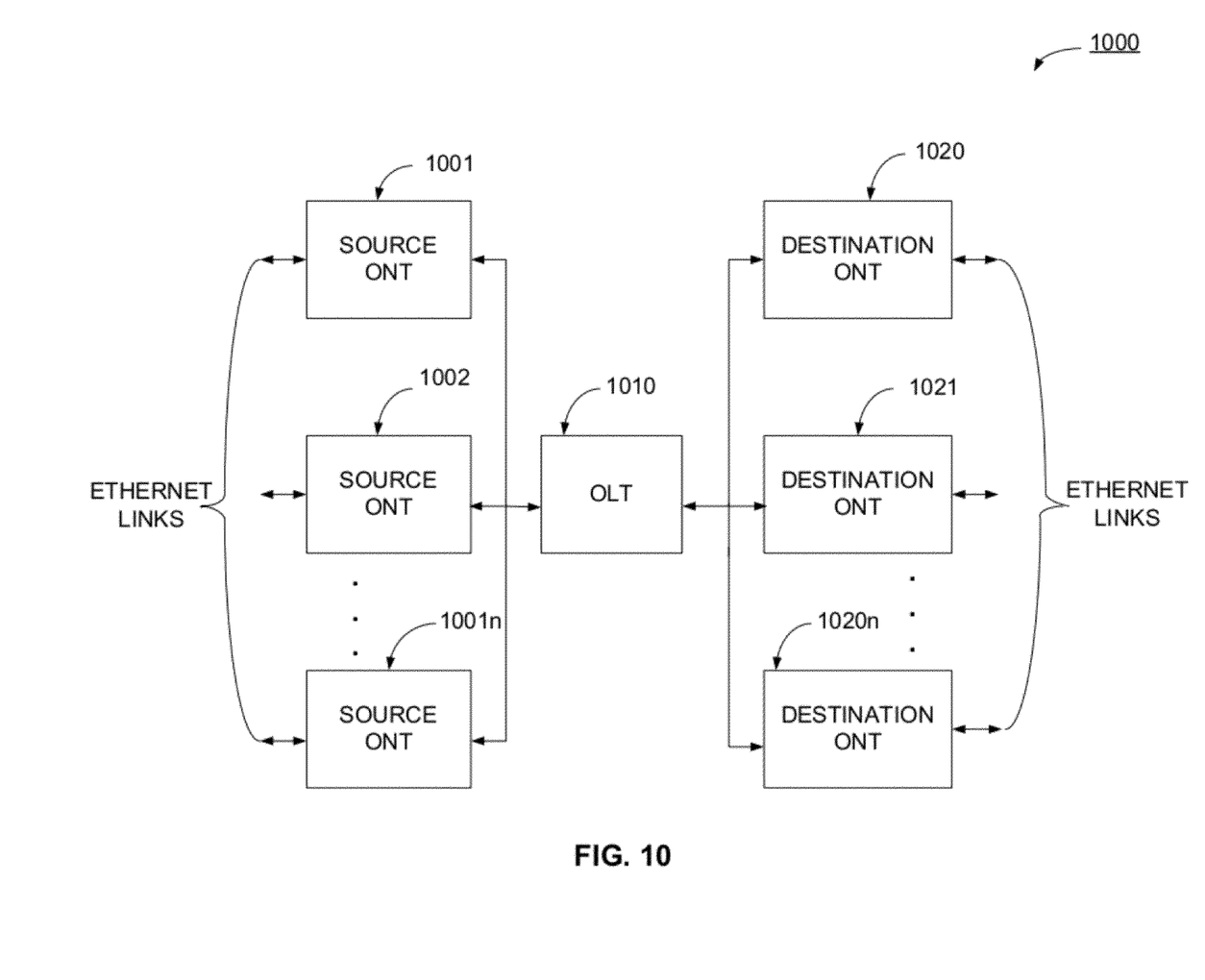
FIG. 10 is a block diagram illustrating a further PON-based wireless backhaul system in accordance with a further embodiment of the present invention, wherein the PON-based wireless backhaul system includes a number of multi-port source ONTs, an OLT, a number of destination ONTs, and a QoS converter in each component in the PON-based system.

FIG. 10 shows a further PON-based wireless backhaul system 1000 in accordance with a further embodiment of the present invention. In FIG. 10, the PON-based wireless backhaul system 1000 includes multiple source ONTs 1001-1001n, an OLT 1010, and multiple destination ONTs 1020-

1020n. The source ONTs 1001-1001n are linked to a number of cell sites (not shown) via Ethernet links. The destination ONTs 1020-1020n are connected to various communication equipments (not shown) of a central office network (not shown) via Ethernet links. Each of the ONTs and the OLT also includes a QoS converter (not shown).

Unlike the embodiments shown in FIGS. 2, 6 and 8, this implementation of the PON-based wireless backhaul system 1000 shown in FIG. 10 does not require that all communication traffic from all the cell sites to be transported to the same destination (e.g., a router within the central office network). In the embodiments shown in FIGS. 2, 6 and 8, all data streams terminate on the same destination (e.g., the router) and are redirected to perspective communication equipments within the central office network.

However, the PON-based wireless backhaul system 1000 shown in FIG. 10 makes it more efficient to transport the communication traffic to the central office network by having each of the destination ONTs connected directly to a communication device or equipment in the central office network. This is due to the fact that not all terminating devices in the central office network are collocated with the router. One such example is the data path for operation, administration, and maintenance (OAM) of the communication network system.

As can be seen from FIG. 10, the destination ONT 1021 can direct all user data traffic to a router of the central office network. As described above, the user data traffic includes voice traffic and Internet or email data traffic from each of the cell sites. The OAM data traffic can be directed to destination ONTs 1020 and 1020n. The destination ONT 1020 can be connected to a base site controller that receives OAM data traffic regarding remote management of the cell sites while the destination ONT 1020n can be connected to a management system that receives OAM data traffic regarding the management of all devices in the PON-based system 1000 and the central office network. Thus, the PON-based wireless backhaul system 1000 shown in FIG. 10 provides wireless carriers the flexibility of redirecting specific data streams to a distinct and remote destination.

While particular embodiments of the present invention have been shown and described, it will be obvious to those of skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A wireless communication network system, comprising:
a central office network including an operation, administration, and maintenance (OAM) router and system management device(s);
a plurality of cell sites having antennas and electronic transceivers, each for communicating wirelessly with external cellular phones within its transmission range;
a passive optical network (PON)-based wireless backhaul (PWB) system that transfers communication information between the cell sites and the central office network, wherein the PWB system further comprises at least a source optical network terminal (ONT), an optical line terminal (OLT), and a quality of service (QoS) converter in each of the source ONT and OLT to allow for quality of service-enabled communication between the cell sites and the central office network via the PWB system, wherein the QoS convert of the source ONT is configured to convert a subscriber identifier to a PON number.

2. The wireless communication network system of claim 1, wherein the source ONT is coupled to the cell sites via Ethernet communication links and the OLT is coupled to the ONT via an optical communication link and to the central office network via an Ethernet communication link.

3. The wireless communication network system of claim 1, wherein the QoS converters in the source ONT and OLT allow for quality of service-enabled communication by having the QoS converter at the source ONT convert QoS parameters indicating traffic types of the communication information into PON numbers and having the QoS converter at the OLT convert the PON numbers back to the QoS parameters.

4. The wireless communication network system of claim 1, wherein the PON-based wireless backhaul system further comprises a destination ONT having a QoS converter, wherein the destination ONT is coupled to the OLT via an optical communication link and to the central office network via an Ethernet communication link.

5. The wireless communication network system of claim 4, wherein the QoS converters in the ONTs and OLT allow for quality of service-enabled communication by having the QoS converter in the source ONT convert QoS parameters indicating traffic types of the communication information into PON numbers and having the QoS converter in the destination ONT convert the PON numbers back to the QoS parameters.

6. The wireless communication network system of claim 1, wherein the PON-based wireless backhaul system further comprises a plurality of source ONTs, each coupled to one of the cell sites, wherein each of the source ONTs includes a QoS converter.

7. The wireless communication network system of claim 1, wherein the PON-based wireless backhaul system further comprises a plurality of source ONTs, each being a multi-port ONT and coupled to a plurality of the cell sites, wherein each of the source ONTs includes a QoS converter.

8. The wireless communication network system of claim 1, wherein the PON-based wireless backhaul system further comprises a plurality of destination ONTs, each coupled to the OLT at a first end and to one of a plurality of communication systems within the central office network at a second end, wherein each of the destination ONTs includes a QoS converter.

9. A wireless backhaul system for transferring communication information between a plurality of cell sites and a central office network, comprising:
at least a source optical network terminal (ONT) coupled to the cell sites via a non-optical communication link;
an optical line terminal (OLT) coupled to the ONT via an optical communication link and to the central office network via a non-optical communication link such that the wireless backhaul system becomes a passive optical network (PON)-based wireless backhaul (PWB) system; and
a quality of service (QoS) converter in each of the ONT and OLT to detect QoS parameters indicating traffic types of the communication information, and convert a subscriber identifier to a PON number communication between the cell sites and the central office network.

10. The wireless backhaul system of claim 9, wherein the QoS converter in the source ONT and OLT allow for quality of service-enabled communication by having the QoS converter in the source ONT convert QoS parameters indicating traffic types of the communication information into PON numbers and having the QoS converter in the OLT convert the PON numbers back to the QoS parameters.

11. The wireless backhaul system of claim 10, wherein the source ONT is coupled to the cell sites via Ethernet communication links and the OLT is coupled to the source ONT via an optical communication link and to the central office network via an Ethernet 3 communication link.

12. The wireless backhaul system of claim 10, the QoS parameters from the cell sites are subscriber Internet Protocol (IP) priority tags and the QoS parameters for the central office network are customer IP priority tags.

13. The wireless backhaul system of claim 12, wherein the QoS converter in the source ONT converts the QoS parameters by determining subscriber IP priority tag of a communication packet and then replacing the tag with a corresponding PON number.

14. The wireless backhaul system of claim 13, wherein the QoS converter in the OLT converts the QoS parameters by determining PON number of a communication packet and replacing the PON number with a corresponding customer IP priority tag.

15. The wireless backhaul system of claim 9, further comprising a destination ONT having a QoS converter, wherein the destination ONT is coupled to the OLT via an optical communication link and to the central office network via an Ethernet communication link, wherein the QoS converter in the ONTs and OLT allow for quality of service-enabled communication by having the QoS converter in the source ONT convert QoS parameters indicating traffic types of the communication information into PON numbers and having the QoS converter in the destination ONT convert the PON numbers back to the QoS parameters.

16. A wireless backhaul system for transferring communication information between a plurality of cell sites and a central office network, comprising:
  a source optical network terminal (ONT) coupled to the cell sites via a first non-optical communication link;
  an optical line terminal (OLT) coupled to the source ONT via a first optical communication link;
  a destination ONT coupled to the OLT via a second optical communication link and to the central office network via a second non-optical communication link such that the wireless backhaul system becomes a passive optical network (PON)-based wireless backhaul (PWB) system, wherein the use of the destination ONT doubles the distance in which the PWB system can physically extend; and
  a quality of service (QoS) converter in each of the source and destination ONTs and the OLT to detect QoS parameters indicating traffic types of the communication information, and convert a subscriber identifier to a PON number to facilitate communication between the cell sites and the PWB system.

17. The wireless backhaul system of claim 16, wherein the destination ONT is coupled to the OLT via an optical communication link and to a router of the central office network via an Ethernet communication link.

18. The wireless backhaul system of claim 16, wherein the QoS converters in the source and destination ONTs allow for quality of service-enabled communication by having the QoS converter in the source ONT convert QoS parameters indicating traffic types of the communication information into PON numbers and having the QoS converter in the destination ONT convert the PON numbers back to the QoS parameters.

19. The wireless backhaul system of claim 16, further comprising a plurality of destination ONTs, each being coupled to one of communication systems of the central office network.

20. The wireless backhaul system of claim 16, wherein each of the source ONTs is a multi-port ONT and is coupled to multiple ones of the cell sites.

* * * * *